Sept. 5, 1933.  O. A. KNOPP  1,925,538
METHOD OF SEALING CONDUITS
Filed Oct. 6, 1931   2 Sheets-Sheet 1
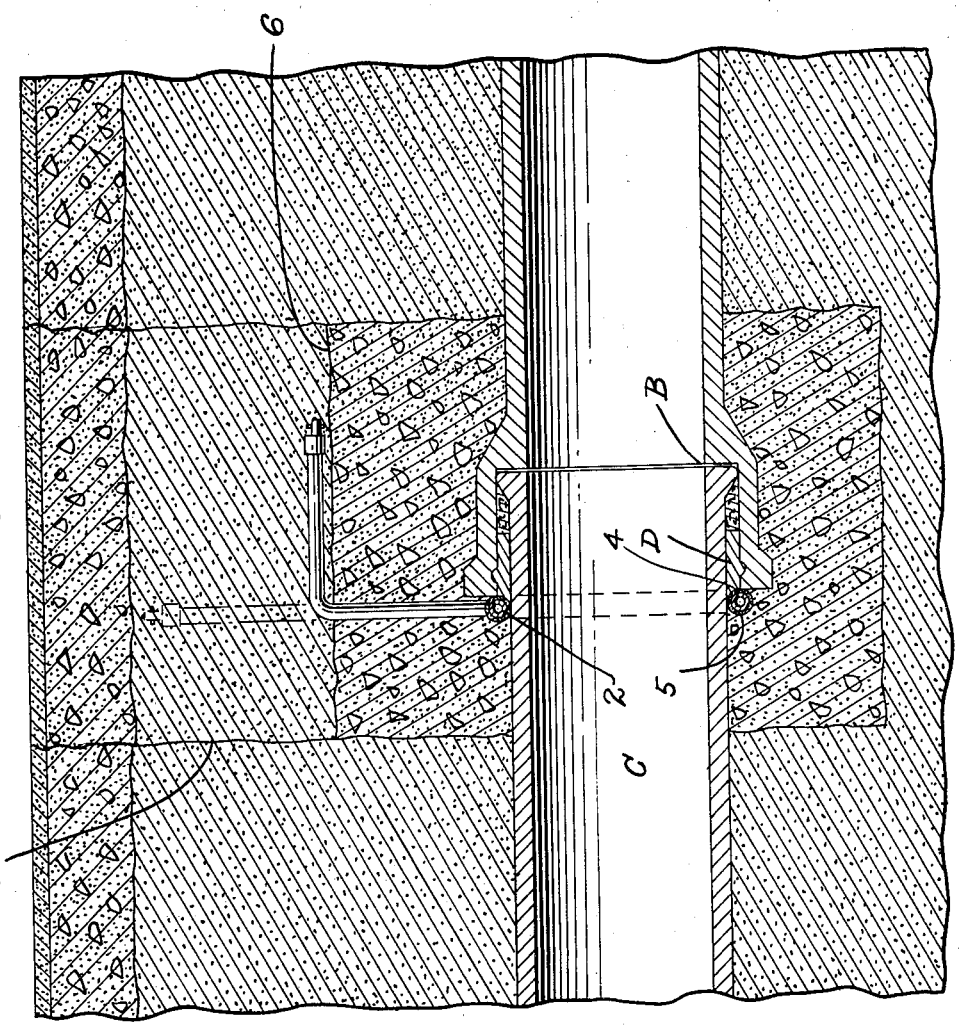
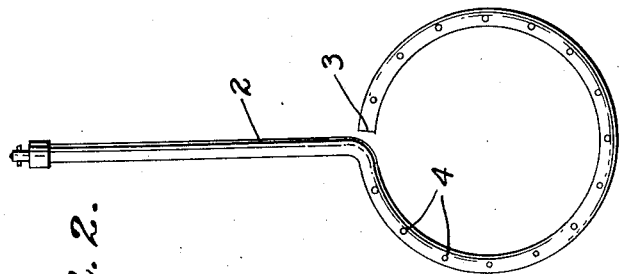
INVENTOR.
Otto A. Knopp.
BY Townsend and Loftus
ATTORNEYS.

Sept. 5, 1933.   O. A. KNOPP   1,925,538
METHOD OF SEALING CONDUITS
Filed Oct. 6, 1931   2 Sheets-Sheet 2
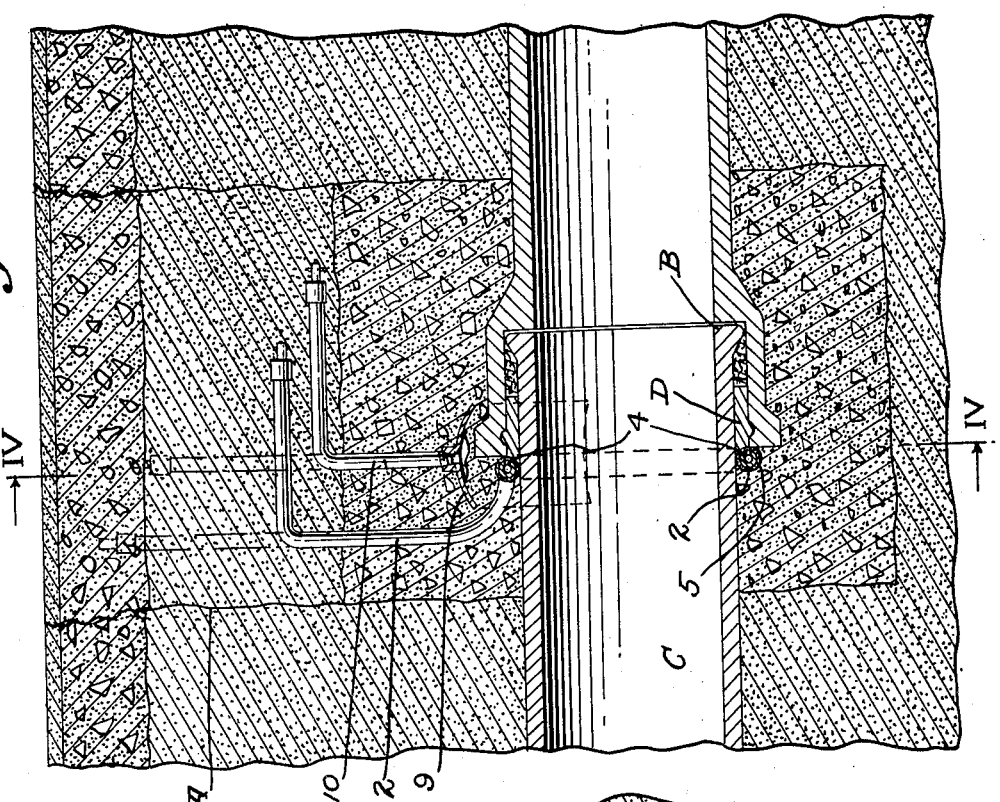
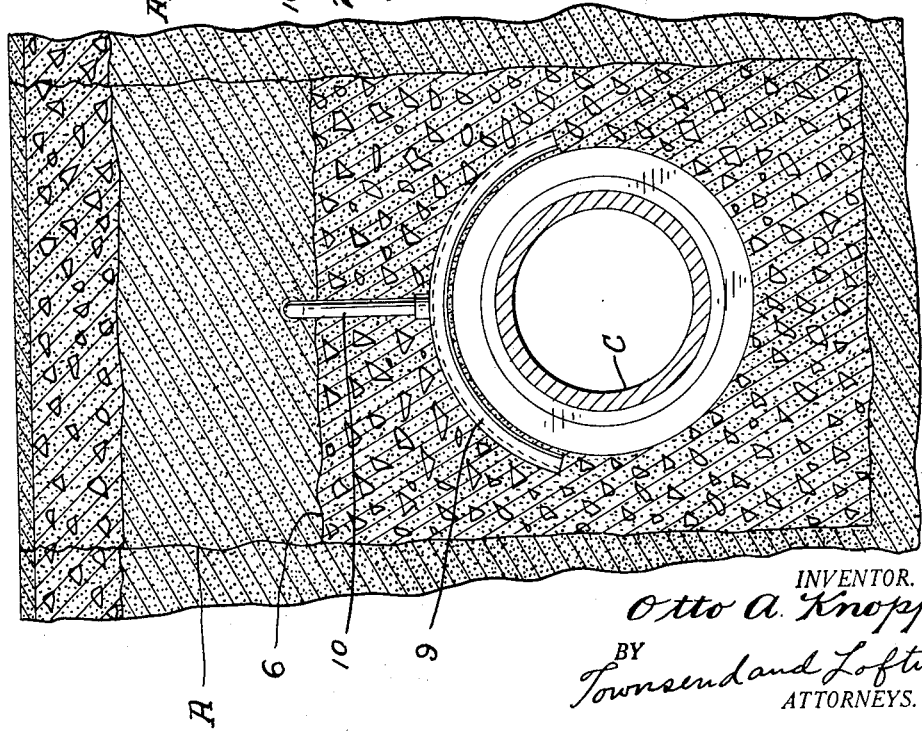
INVENTOR.
Otto A. Knopp.
BY Townsend and Loftus
ATTORNEYS.

Patented Sept. 5, 1933

1,925,538

UNITED STATES PATENT OFFICE 1,925,538

METHOD OF SEALING CONDUITS

Otto A. Knopp, Oakland, Calif.

Application October 6, 1931. Serial No. 567,151

5 Claims. (Cl. 137—99)

This invention relates to a method of sealing pipes and like conduits and particularly to a method of sealing pipe joints or leaks which may develop in a pipe line between joints.

Pipe lines such as used for conveying gas and other fluids are often joined end to end by means of a bevel or slip joint, and a packing material in the form of oakum, lead or the like is driven into the joints to maintain the joints tight. Many of the pipe lines now in use were laid at the time when manufactured gas was employed. Manufactured gas carries a considerable amount of tarry substances and this works into the packing and, if anything, tends to pack it tighter than ever, hence comparatively small leakage losses were encountered as long as manufactured gas was being handled. Within the last few years manufactured gas has practically gone out of existence in the western portion of the United States as large fields of natural gas have been tapped and practically all lines now carry natural gas. It has been found that the natural gas is exceedingly dry and tends to dissolve the tarry substance previously deposited in the packing material and after awhile the joints begin to leak.

The object of the present invention is to provide a simple method whereby leaks of this character may be readily and permanently sealed and, further, to provide a method whereby leaky joints and leaks at points intermediate the joints may be sealed regardless of the fact that the pipe line is in operation and that considerable leakage may take place due to the pressure in the line while the repair is being made.

The invention briefly stated consists, first, in excavating a sufficient amount of dirt to uncover the leaky joint; secondly, surrounding the leaking joint with a perforated tube; third, covering or surrounding the joint and the perforated tube with concrete; and fourth, after the concrete has set injecting under high pressure a sealing compound such as soap or the like to seal the leak and simultaneously impregnate the adjacent portions of the concrete.

The method of sealing employed is shown by way of illustration in the accompanying drawings, in which—

Fig. 1 is a side elevation in section of a buried pipe line showing the method of sealing one of the pipe joints.

Fig. 2 is a side elevation of the perforated pipe which is applied to the leaking joint and whereby the sealing compound is delivered to seal the joint.

Fig. 3 is a section similar to Fig. 1, showing the method of sealing the joint when the pipe line is in operation.

Fig. 4 is a cross section taken on line IV—IV of Fig. 3.

Where a pipe line has been in use and it is found that a joint is leaking, a sufficiently large excavation is made as indicated at A to uncover the joint. After the joint has been uncovered, it is first necessary to either re-pack or tamp the packing in the joint so as to at least temporarily stop the leak. After this has been accomplished, a tube such as shown at 2 in Fig. 2 is then wrapped around the pipe at a point just ahead of the joint indicated at B and a portion of the tube is extended upwardly so as to permit it to be connected with a pump or other pressure device, as will hereinafter be described.

The tube 2 may be constructed of any suitable material. During the manufacture of the same, the end indicated at 3 is closed. The tube is then filled with a soap or other suitable sealing compound, and it is then perforated or drilled as indicated at 4, to permit the soap or sealing compound to be forced out of the tube later on. After the tube has been filled with soap and perforated, a stocking, or sleeve, formed from any suitable fabric and impregnated with soft soap, or the like, is slipped over the perforated end of the tube, and it is then bent into place or wrapped around the pipe C at a point just ahead of the pipe joint B. It is wrapped tightly about the pipe and it is forced against the packing material shown at D. This consists of oakum and lead, and it is this packing which often springs a leak.

After the tube, together with the wrapping of soap-impregnated fabric, has been placed in position, soft soap may be placed in the corners so as to prevent the concrete from forcing its way between the tube 2 and the packing material in the pipe joint, and when this is accomplished, fresh concrete is dumped into the excavation and a sufficient amount of concrete is used to bring the level of the same up to the point indicated at 6. The concrete is then permitted to set, and when it has completely set a fitting, or the like, such as shown in Fig. 2, is applied to the upper end of the tube and this is connected with a pressure gun, or like device. The gun will be filled with soft soap, and when pressure is applied the soap will be forced downwardly through the tube and out through the perforations 4. It will then pass out through the porous or fabric covering on the tube and it will impregnate the surrounding concrete and will also fill and seal any leakage passages or space formed therein. Thereafter, it will only be necessary to bend the upper end of the pipe downwardly against the concrete and fill the hole with the dirt or other material previously excavated; and if the excavation has been made in the street surface the pavement may be restored, thus leaving the ground in the condition it was prior to the making of the excavation.

If, at a later date, it is found that the joint is again leaking, it is only necessary to open the same excavation so as to uncover the alemite fitting, and again connect a grease gun and inject a sufficient amount of additional soap to seal the leak.

The soap-impregnated wrapping or covering used in conjunction with the perforated tube is shown at 5. It is not absolutely essential in actual use, but it is desirable as it prevents the fresh or wet concrete from entering the perforations in the tube and clogging the same. Such clogging of the tube, and particularly the perforations formed therein, is positively prevented by employing the soap-impregnated fibrous covering previously described.

In practically all instances where a leaking line is being repaired, it will be understood that the line is in service as it is, practically speaking, impossible to shut off the gas while repairs are being made. In most instances the leaking joint can at least be temporarily stopped by re-tamping the packing, but in some instances it is practically impossible to entirely stop the leak, for instance when there is a crack in the coupling and so on. Where it is impossible to entirely stop the leak a slightly different method is employed.

After the excavation has been made, see Fig. 3, and the concrete has been poured into position, a shield or trap member, such as indicated at 9, is employed. That is, after sufficient concrete has been poured to cover the pipe, it will be found that the escaping or leaking gas will form a channel in the concrete at a point above the leak. Hence it is only necessary to take the shield or trap member shown at 9 and to insert it in the fresh concrete above the point of the leak or channel formed by the same and then to fill in the remaining concrete; hence all escaping gas will collect in the trap, and as this is provided with an upwardly extending pipe 10, the gas will freely escape while the concrete is setting. After the concrete has set, it is only necessary to apply a gun to inject the soft soap or other sealing compound employed, through the tube 10 into the trap or shield, and as the sealing compound collects under pressure, it will gradually work down through the channel formed by the gas in the concrete, and will finally completely fill the same and seal the leak.

If it is desired to be doubly sure, a perforated pipe 2 may be placed in position just as described in connection with Fig. 1. Hence, soft soap, or a like sealing compound, may be introduced through the tube 2 and also through the tube 10. The trap member indicated at 9 in Fig. 3 may be constructed of thin sheet metal, or the like. It is arcuate in side elevation as shown in Fig. 4 and it is also arcuate in cross-section, as shown in Fig. 3; hence forming a trap chamber to collect the escaping gases while the concrete is setting.

The method disclosed in Figs. 3 and 4 is also employed in instances where the packing in the joint has been replaced or re-tamped to temporarily stop the leak. For instance, the workmen, who have uncovered the leaking joint and who have either replaced or re-tamped the packing, may be of the opinion that the packing is tight, but after the concrete has been poured in place it is found that a small amount of gas is leaking through the fresh concrete. In that case, the shield or trap method will be resorted to and the leaking gas can thus freely escape while the concrete is setting and the leak will then be sealed as described.

In actual practice it has been found that a complete bond between the concrete and the pipe surface is not obtained. This is due to the shrinkage which takes place in the concrete during the setting of the same, hence it is obvious that the sealing compound employed must be utilized to fill the space between the pipe and the concrete surrounding the same, as leakage might otherwise take place through this pipe. By placing the perforated tube 2 around the pipe and in substantial contact with the pipe surface, it is obvious that after the concrete has set and when the soft soap or other sealing compound employed is introduced under pressure the sealing compound will not only seal the pipe joint but it will also seal any leakage passages formed by escaping gas in the concrete, and furthermore, it will fill and seal the space between the concrete and the pipe and thus effectually seal every avenue of escape.

It was stated in the preamble of the specification that leakage was often produced in old pipe lines due to the fact that the natural gas was dry and that it tended to dissolve the tarry substance previously contained in the packed joints. This, however, is not the only cause of leakage as leakage may be developed by contraction or expansion of the pipe, or by settling of the ground in which the pipe is laid. Where a slight settling takes place the seal between the lead and the joint breaks and leakage will obviously occur, but when a joint of this character has been reinforced by a surrounding jacket of concrete, such as used in the present method of sealing, working or bending of the joints is eliminated and development of leaks due to ground settlement is rather unlikely.

While the invention has been particularly described in connection with the repairing or sealing of leaks formed in pipe lines which have already been laid, it is obvious that the same method may be used in conjunction with new lines that are being laid. If ordinary bell or slip joints, such as shown in Fig. 1, are employed, the same packing or any other similar packing will be inserted, but the care usually required can be eliminated in this case as the perforated tube 2 will be placed in position and the concrete poured around the same; hence, if the packing when inserted, is not absolutely leak-proof, it will be leak-proof when the surrounding concrete and the packing becomes impregnated with the sealing compound. Hence the method of sealing is equally applicable to new as well as to old pipe lines and like conduits, and while the invention has been shown in conjunction with a bell or slip type of joint, it is obvious that any other type of joint may be employed, and while certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. A method of sealing a leaking conduit which consists in placing a tube adjacent the leak, said tube having an opening formed therein for the delivery of a sealing compound to the surface of the conduit, surrounding the tube and the leaking portion of the conduit with fresh concrete and when the concrete has set, introducing through the tube under high pressure a sealing compound to impregnate the surrounding concrete and to fill and seal all passages in the concrete and any spaces between the concrete and the surface of the conduit.

2. A method of sealing a leaking conduit carrying any fluid under pressure which consists in surrounding the leaking portion of the conduit with fresh concrete, placing a trap in the fresh concrete to collect fluid escaping through the leak and the fresh concrete, covering the trap with additional concrete, connecting a tube with the trap to permit the leaking fluid collected by the trap to escape while the concrete is setting, and introducing a sealing compound through the tube when the concrete has set, to seal the leak and the passage formed in the concrete by the escaping fluid.

3. A method of sealing a joint in a pipe line which consists in placing a perforated tube around the pipe joint, enclosing the perforated tube in a porous covering, surrounding the pipe joint and the perforated tube with fresh concrete and when the concrete has set, introducing through the tube under high pressure a sealing compound to seal the leak and to impregnate the adjacent or surrounding concrete.

4. A method of sealing leaks in pipes which consists in casting a concrete sleeve around the leaking portion of the pipe and after the concrete has become set introducing a sealing medium between the outer surface of the pipe and the inner surface of the concrete sleeve to render said inner surface of the concrete sleeve impervious to leakage and to seal any passages formed between the outer surface of the pipe and the inner surface of the concrete sleeve.

5. A method of sealing leaks in pipes where the latter are under internal pressure, which consists in enveloping the pipe adjacent to the leak with a flexible perforated tube, the perforations in the tube being temporarily closed against the entry of foreign substance into the tube, enveloping the tube and pipe in concrete to embed the tube and to form a sleeve about the pipe, allowing the concrete to set and then injecting a sealing compound through the tube and perforations thereof and the temporary closure therefor into the mass of concrete and the interstices through which leakage may occur.

OTTO A. KNOPP.